May 16, 1944.　　　H. P. CORDES　　　2,348,787
PLANTING MECHANISM
Filed April 9, 1943　　　2 Sheets-Sheet 1
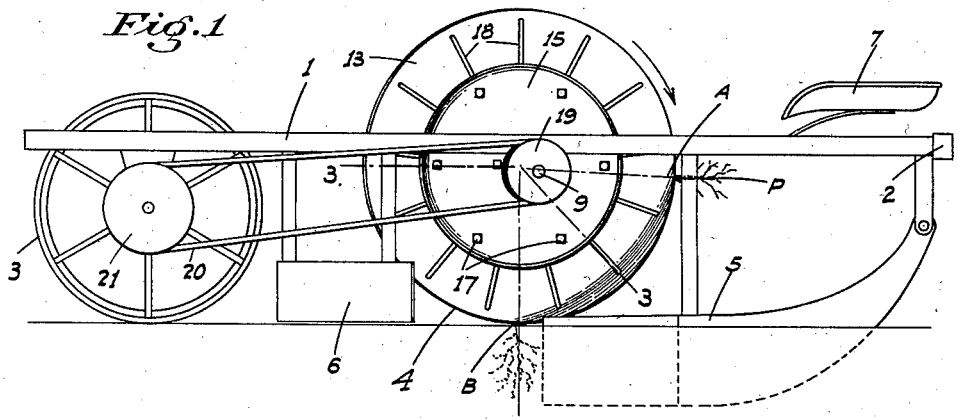
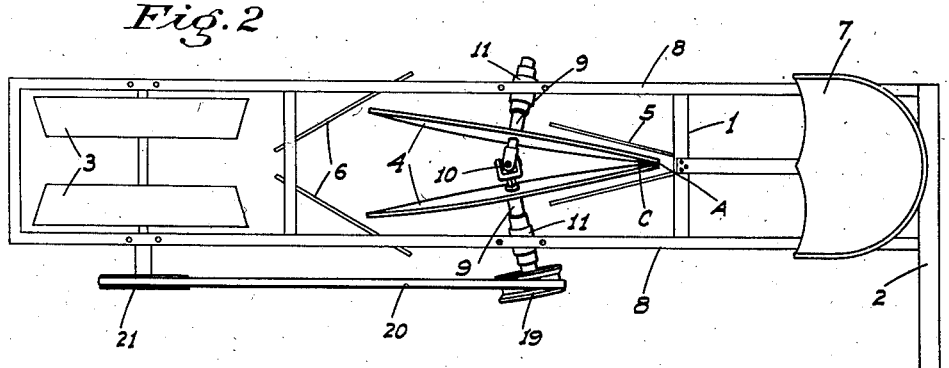
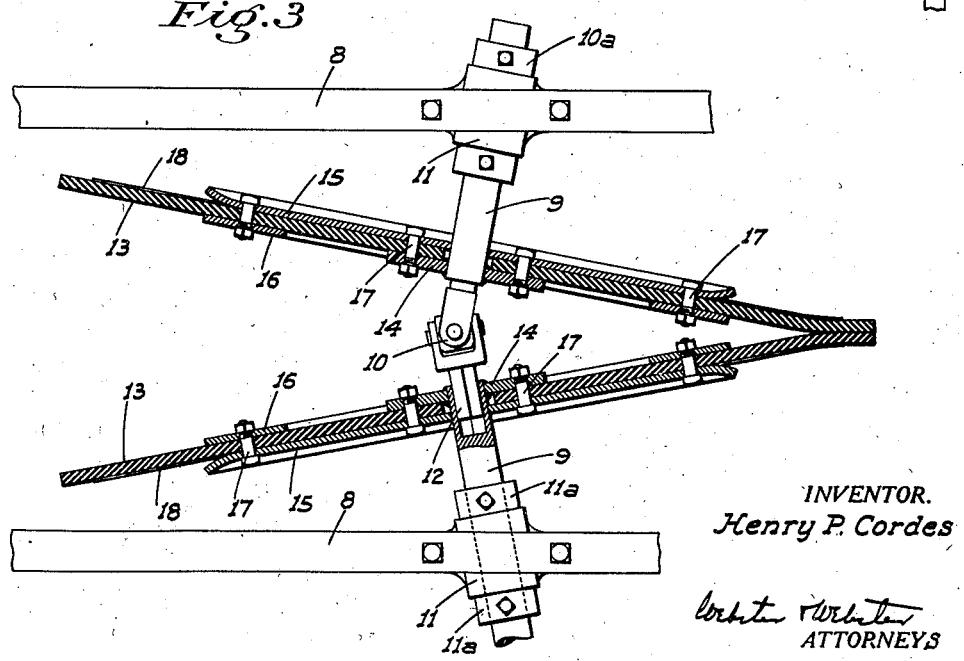
INVENTOR.
Henry P. Cordes
ATTORNEYS May 16, 1944.  H. P. CORDES  2,348,787
PLANTING MECHANISM
Filed April 9, 1943   2 Sheets-Sheet 2

INVENTOR
Henry P. Cordes
BY
ATTORNEYS

Patented May 16, 1944

2,348,787

UNITED STATES PATENT OFFICE 2,348,787

PLANTING MECHANISM

Henry P. Cordes, Tracy, Calif.

Application April 9, 1943, Serial No. 482,412

16 Claims. (Cl. 111—3)

This invention relates generally to a row-crop planter of the type which functions to mechanically set young nursery-grown plants in field rows in predetermined spaced relation. In particular the invention is directed to, and it is an object to provide, in an implement of the type described, a unique plant holding and depositing mechanism.

A further object of the present invention is to provide a plant holding and depositing mechanism for a planter as above, which mechanism comprises a pair of driven laterally facing discs rotatably supported from the implement frame; these discs being flexible and resilient and disposed in such forwardly and downwardly converging relation to each other so as to frictionally engage and run together in plant holding relation at and adjacent their periphery, and for a peripheral extent between a predetermined plant feeding point adjacent an operator's seat on the implement and a plant discharge or depositing point at substantially the low point of the discs and adjacent the plant receiving furrow.

An additional object of this invention is to provide a plant holding and depositing mechanism, as in the preceding paragraph, in which said mechanism includes means to stabilize the flexible discs against lateral deflection radially inwardly of the peripheral portion thereof; said means comprising rigid and circular stabilizing plates engaging in clamping relation on opposite sides of each of the discs, and circumferentially spaced spring fingers formed with and projecting radially out from the outside stabilizing plates in frictional holding engagement with said discs but terminating short of the periphery thereof.

A still further object of this invention is to provide mounting means for the cooperating discs, which mounting means are arranged so that said discs can be relatively adjusted in an axial direction whereby to regulate the radial extent to which said discs run together between the plant feeding and plant discharge points, and to also regulate the pressure exerted on a plant disposed between said points and traveling between said points.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a somewhat diagrammatic side elevation of a plant setting implement incorporating my improved plant holding and depositing mechanism.

Figure 2 is a somewhat diagrammatic plan view of the implement showing the forward and slightly downward convergence of the flexible discs which run together between certain points to form the plant-holding and depositing mechanism.

Figure 3 is an enlarged fragmentary plan view of the plant holding and depositing mechanism as mounted in the implement frame, said mechanism being shown in section substantially on line 3—3 of Fig. 1.

Figure 4:
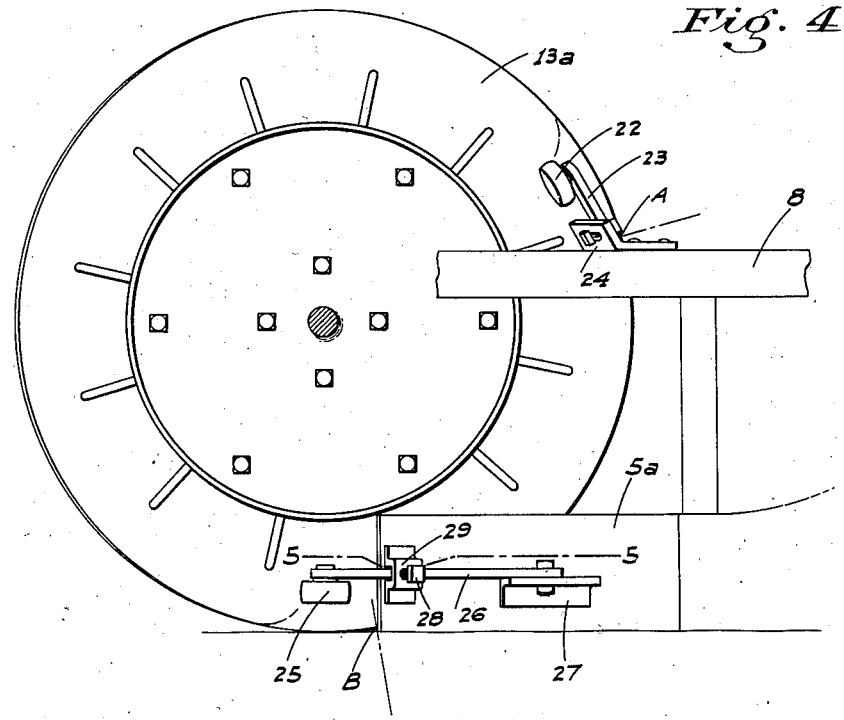
Figure 4 is an enlarged side view of the plant holding mechanism, showing the auxiliary disc engaging devices.

Referring now more particularly to the characters of reference on the drawings, and particularly at present to Figs. 1 to 3, the implement upon which the plant holding and depositing mechanism is mounted comprises generally a horizontally disposed, elongated frame 1 fitted at its forward end with a transversely extending draft bar 2 arranged for rigid connection in multiple with other planters and for draft connection with a tractor. At its rear end the frame is supported by ground engaging wheels 3. Intermediate the ends of the frame, the latter supports the driven, plant holding and depositing mechanism shown generally at 4 and which is hereinafter described in detail.

A plow or furrow opener 5 is mounted on and depends in rigid relation from the frame and leads the planting mechanism 4, while a furrow-closing unit 6, here shown as rearwardly converging blades, is mounted on and depends from the frame in following relation to the planting mechanism. An operator's seat 7 is mounted on the frame ahead of the planting mechanism 4, the seat facing rearwardly and being disposed so that the operator can readily feed plants one at a time into the planting mechanism 4 at the front.

The above described assembly is, in its general combination of elements, conventional in mechanical row-crop planters, and the present invention resides in the provision of a unique planting mechanism, as shown generally at 4, and which comprises the following:

The frame of the implement includes longitudinally extending transversely spaced side beams 8 from which a pair of relatively short shafts 9 extend inwardly in converging relation at a rearward and slightly upward angle relative to said frame; said shafts at their inner and adjacent ends being connected by a universal joint 10. The shafts are rotatably supported from the side beams 8 of the frame by means of bearings 11, said shafts extending through said bearings in normally fixed but axially adjustable relation, adjustment being effected by loosening collars 11a on the shafts and which engage the bearings at opposite ends. One of said shafts adjacent the universal joint 10 includes a spline connection 12.

A pair of relatively large-diameter, flexible and resilient discs 13, of fabric reinforced rubber or the like, are mounted on the shafts 9 by means of hubs 14 driven in the direction shown by the arrow in Fig. 1. By reason of the rearward and upward angling of the converging shafts 9, the discs when mounted radially thereon are disposed in a forwardly and downwardly converging relation as shown and whereby said discs frictionally engage and run together from a point A within reach of the operator's seat to approximately the low point B of the discs and at substantially the point of closest approach of said discs to the furrow opened by the furrow opener 5; said points A and B lying in the radial planes indicated by broken lines in Fig. 1.

The radial extent to which the discs 13 run together between points A and B can be regulated by axial adjustment of the shafts 9 and which adjustment is possible by reason of the employment of the spline connection 12.

In order to stabilize the flexible and resilient discs radially inwardly of the peripheral portions thereof which run together, circular plates 15 and 16 are engaged in clamping relation on opposite sides of each disc and are secured to said disc and to the corresponding hub 14 by tie bolts 17. Circumferentially spaced, radially extending spring fingers 18 are fixed on and project radially outwardly from the outside stabilizing plates 15; said spring fingers frictionally engaging the discs and the outside but terminating some distance short of the periphery thereof. The spring fingers, in addition to stabilizing the peripheral portions of the discs, also serve to increase the pressure of the frictional engagement between said discs as they run together between points A and B.

The shafts 9, together with the discs 13, are driven by means of a wide-faced pulley 19 mounted on the outer end of one of said shafts, and an endless belt extends between said pulley 19 and another pulley 21 fixed with one ground-engaging wheel 3. Thus, with movement of the implement over the ground, the planting mechanism, i. e. the discs 13, are driven in the same direction as wheel 3, and the peripheral speed of discs 13 is substantially the same as ground speed of the implement.

In operation, the operator sits on seat 7 and faces rearwardly toward the planting mechanism. Adjacent the seat there is disposed a supply box (not shown) in which are laid the young plants to be planted. At predetermined intervals, indicated by a timed, audible signal or the like, the operator places a plant P in the cradle C formed between the rotating discs at point A; the plant being disposed with its roots outermost and beyond the periphery of the disc. Immediately upon the plant being placed in cradle C, the plant is frictionally engaged between the discs, which run together beyond said point, and is thus frictionally held against accidental displacement. The plant then travels with the disc until it reaches point B, whereupon the discs separate and the plant drops upright into the furrow formed by the furrow opener 5.

By virtue of the use of flexible discs running together as described, the planting mechanism functions smoothly and efficiently regardless of variance in the size of the plant stalk or the like. Additionally, the planting mechanism is ready to receive a plant from the operator at any time which the audible signal device may indicate, thus assuring that quite even spacing can be maintained between the plants of a row.

By reason of the adjustability of the shafts 9, the circumferential extent of contact and deformation of the discs may be altered to suit different plants.

For certain plants, it is desirable that the arc of contact of the discs shall be increased, without altering their angularity as a whole, or without increasing the pressure exerted by the discs on a plant held therebetween; and so that the inception and termination of the arc of contact shall be relatively abrupt.

Figure 5:
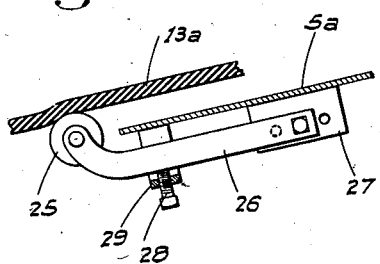
Figure 5 is a fragmentary sectional plan on line 5—5 of Fig. 4.
Figure 6:
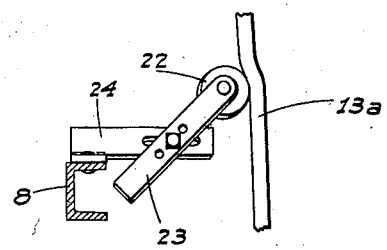
Figure 6 is a fragmentary end view showing the upper disc engaging device.

This result is obtained by the use of the devices shown in Figs. 4 to 6. One device comprises, for each disc 13a a roller 22 disposed radially of the disc and engaging the same adjacent its periphery above the normal initial contact point A of the discs. This roller is mounted on an arm 23 which is adjustably secured, for movement both laterally and circumferentially of the disc, on a bracket 24 mounted on the adjacent side beam 8. The rollers of the two discs when thus disposed and properly set, cause the flexible discs to be brought into contact before they would otherwise do so, and advance the initial point of contact to an extent determined by the circumferential positioning of the rollers relative to point A.

Also, by reason of these rollers, the discs are suddenly deformed into contact with each other, leaving a relatively wide and abruptly closing gap between the discs ahead of the rollers into which the plants may be easily projected. Similarly at the bottom of the arc of contact of the discs, such arc is extended relative to the normal termination point B by means of a roller 25 for each disc engaging the same beyond the furrow opener 5a. Roller 25 is mounted on an arm 26 swivelly secured for adjustment horizontally (or substantially circumferentially of the disc) on a bracket 27 mounted on the adjacent member of the furrow opener. The roller may be shifted laterally, or so that it will engage the disc with different pressures, by means of an adjustment screw 28 engaging the outer edge of the arm 26 and mounted in a bracket 29 secured on said member of the furrow opener.

Here again, these lower rollers provide a suddenly opening gap between the discs beyond the rollers, which allows of a quicker release of the plants.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A row planting mechanism for a plant setting implement which includes a frame supported above the ground for movement along a row, said mechanism comprising a pair of laterally facing, circular rotary members which are flexible and resilient at and adjacent the periphery thereof, means rotatably mounting said members from the frame in adjacent, forwardly and downwardly converging relation whereby unbroken peripheral portions of said members continuously run together in frictional engagement between a point some distance above the ground and a point adjacent the ground, and means to simultaneously rotate said members in the direction of movement of the implement.

2. A row planting mechanism for a plant setting implement which includes a frame supported above the ground for movement along a row, said mechanism comprising a pair of laterally facing, circular rotary discs which are flexible and resilient at and adjacent the periphery thereof, means rotatably mounting said discs from the frame in adjacent, forwardly and downwardly converging relation whereby unbroken peripheral portions of said discs continuously run together in frictional, plant holding engagement between one point some distance above the ground and another point adjacent the ground, and means to simultaneously rotate said discs in the direction of movement of the implement.

3. A row planting mechanism for a plant setting implement which includes a frame supported above the ground for movement along a row, said mechanism comprising a pair of laterally facing, circular rotary discs which are flexible and resilient at and adjacent the periphery thereof, means rotatably mounting said discs from the frame in adjacent, forwardly and downwardly converging relation whereby peripheral portions of said discs run together in frictional, plant holding engagement between one point some distance above the ground and another point adjacent the ground, and means to simultaneously rotate said discs in the direction of movement of the implement; said disc mounting means being arranged for axial adjustment of said discs whereby to permit of regulation of the pressure with which said peripheral portions engage.

4. A planting mechanism as in claim 2 in which the discs run together for approximately 90°; said other point being substantially at the low point of the discs.

5. A row planting mechanism for a plant setting implement which includes a frame supported above the ground for movement along a row, said mechanism comprising a pair of shafts journaled on the frame and disposed in converging relation at a rearward and upward angle, resilient discs fixed on said shafts in adjacent relation, the discs thus converging forwardly and downwardly and being of a diameter to run continuously together at and adjacent their unbroken peripheries between a point some distance above the ground to a point adjacent the ground, and means to simultaneously rotate said discs in the direction of movement of the implement.

6. A planting mechanism as in claim 5 in which said shafts are coupled at adjacent ends by means of a universal joint.

7. A planting mechanism as in claim 5 in which said shafts are coupled at adjacent ends by means of a universal joint, and one shaft including a spline connection connected with the universal joint; the shafts being mounted for relative axial adjustment.

8. A row planting mechanism for a plant setting implement, said mechanism comprising a pair of transversely facing, flexible, and resilient discs, means mounting said discs for simultaneous rotation as a unit, the discs converging forwardly and downwardly and continuously running together in frictional, plant holding engagement between a point some distance above the ground and another point adjacent the ground, and means to rotate said disc unit.

9. A row planting mechanism for a plant setting implement, said mechanism comprising a pair of transversely facing, flexible, and resilient discs, means mounting said discs for simultaneous rotation as a unit, the discs converging forwardly and downwardly and running together in frictional, plant holding engagement between a point some distance above the ground and another point adjacent the ground, means to rotate said disc unit, and circular stabilizing plates of lesser diameter than the discs secured concentrically on the outside of the latter.

10. A row planting mechanism for a plant setting implement, said mechanism comprising a pair of transversely facing, flexible, and resilient discs, means mounting said discs for simultaneous rotation as a unit, the discs converging forwardly and downwardly and running together in frictional plant holding engagement between a point some distance above the ground and another point adjacent the ground, means to rotate said disc unit, circular stabilizing plates of lesser diameter than the discs secured concentrically on the outside of the latter, and a plurality of circumferentially spaced, radially extending spring fingers on the stabilizing plates and frictionally engaging against the outside of said discs radially outwardly thereof, said fingers terminating short of the periphery of said discs.

11. A row planting mechanism for a plant setting implement, said mechanism comprising a pair of transversely facing, flexible and resilient discs, means mounting said discs for simultaneous rotation as a unit, the discs converging forwardly and downwardly and running together in frictional, plant holding engagement between a point some distance above the ground and another point adjacent the ground, circular stabilizing plates of lesser diameter than the discs secured on opposite sides of each disc in clamping relation thereto, and circumferentially spaced spring fingers projecting radially outward from each outside stabilizing plate in frictional engagement with the corresponding disc, said fingers terminating adjacent but short of the disc periphery.

12. A row planting mechanism for a plant setting implement, said mechanism comprising a pair of transversely facing, flexible, and resilient discs, means mounting said discs for simultaneous rotation as a unit, means to rotate the unit, the discs converging forwardly and running together and being deformed to provide an arc of contact extending from a point some distance above the ground to another point adjacent the ground, and separate means deformably engaging the discs beyond the normal arc of contact at one end thereof to extend such arc beyond said end a predetermined distance.

13. A structure as in claim 12, in which said means, for each disc, comprises a roller disposed with its axis substantially radially of the disc and engaging the outer face of the same adjacent its periphery.

14. A structure as in claim 12, in which said means, for each disc, comprises a roller riding the outer face of the disc adjacent its periphery and means mounting the roller for adjustment circumferentially of the disc.

15. A structure as in claim 12, in which said means, for each disc, comprises a roller riding the outer face of the disc adjacent its periphery and means mounting the roller for adjustment circumferentially of the disc and for independent adjustment laterally of the disc.

16. A row planting mechanism for a plant setting implement, said mechanism comprising a pair of transversely facing, flexible, and resilient discs, means mounting said discs for simultaneous rotation as a unit, means to rotate the unit, the discs converging forwardly and running together and being deformed to provide an arc of contact extending from a point some distance above the ground to another point adjacent the ground, and separate means deformably engaging the discs beyond the normal arc of contact at both ends thereof to extend such arc predetermined amounts beyond said ends.

HENRY P. CORDES.